(12) United States Patent
Doo et al.

(10) Patent No.: US 11,993,166 B2
(45) Date of Patent: May 28, 2024

(54) INVERTER MODULE INTEGRATABLY MOUNTABLE WITH DRIVE UNIT OF VEHICLE

(71) Applicant: Rivian IP Holdings, LLC, Plymouth, MI (US)

(72) Inventors: Young Doo, La Palma, CA (US); Silva Hiti, Redondo Beach, CA (US); Juan Lopez, Plymouth, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 80 days.

(21) Appl. No.: 17/244,288

(22) Filed: Apr. 29, 2021

(65) Prior Publication Data

US 2022/0348091 A1 Nov. 3, 2022

(51) Int. Cl.
| | | |
|---|---|---|
| *B60K 1/00* | (2006.01) | |
| *B60K 1/02* | (2006.01) | |
| *B60K 1/04* | (2019.01) | |
| *B60L 53/20* | (2019.01) | |
| *F16H 57/029* | (2012.01) | |
| *F16H 57/02* | (2012.01) | |

(52) U.S. Cl.
CPC ............. *B60L 53/20* (2019.02); *B60K 1/02* (2013.01); *B60K 1/04* (2013.01); *F16H 57/029* (2013.01); *B60K 2001/001* (2013.01); *B60K 2001/0438* (2013.01); *F16H 2057/02034* (2013.01); *F16H 2057/02052* (2013.01)

(58) Field of Classification Search
CPC ......... F16H 57/029; F16H 2057/02034; F16H 2027/02052; B60L 53/20; B60K 1/02; B60K 1/04

USPC ........................................................ 180/65.6
See application file for complete search history.

(56) References Cited

U.S. PATENT DOCUMENTS

| | | | | |
|---|---|---|---|---|
| 6,201,365 B1* | 3/2001 | Hara | ......................... | B60L 1/02 |
| | | | | 903/952 |
| 6,323,613 B1* | 11/2001 | Hara | ...................... | H02K 16/00 |
| | | | | 903/952 |
| 9,248,731 B2* | 2/2016 | Soma' | .................... | B60W 10/26 |
| 9,452,682 B2* | 9/2016 | Triantos | .................. | B60L 50/61 |
| 10,253,763 B2* | 4/2019 | Nakagami | ............. | F04C 23/008 |
| 10,780,849 B1* | 9/2020 | Garcia | ................ | B60R 16/0231 |
| 2003/0200761 A1* | 10/2003 | Funahashi | ........... | F04C 29/0085 |
| | | | | 62/228.4 |
| 2008/0205107 A1* | 8/2008 | Hattori | ................. | H05K 7/1432 |
| | | | | 29/854 |
| 2009/0260226 A1* | 10/2009 | Tinguely | .............. | H03H 9/1021 |
| | | | | 29/739 |

(Continued)

OTHER PUBLICATIONS

Fred Lambert, "GM Unveils Its Lineup of Ultium Electric Drive Units.", Sep. 16, 2020, 1-3.

*Primary Examiner* — Hau V Phan
(74) *Attorney, Agent, or Firm* — BAKERHOSTETLER (57) ABSTRACT

Various disclosed embodiments include illustrative inverter modules that are integratably mountable with a drive unit of a vehicle, illustrative drive units with an inverter module integratably mounted therewith, and illustrative vehicles with at least one drive unit with an inverter module integratably mounted therewith. Given by way of non-limiting example, an illustrative module for a drive unit of a vehicle includes a housing having an open face defined therein. Inverter circuitry is disposed in the housing.

6 Claims, 11 Drawing Sheets

(56) References Cited

U.S. PATENT DOCUMENTS

| | | | |
|---|---|---|---|
| 2010/0127583 A1* | 5/2010 | Yoshida | H02K 11/05 |
| | | | 310/59 |
| 2011/0109180 A1* | 5/2011 | Akutsu | B60K 6/52 |
| | | | 903/902 |
| 2015/0133263 A1* | 5/2015 | Choi | B60K 17/356 |
| | | | 477/3 |
| 2016/0039277 A1* | 2/2016 | Falls | H02K 7/006 |
| | | | 310/58 |
| 2017/0136864 A1* | 5/2017 | Ito | H01M 10/6563 |
| 2020/0062541 A1* | 2/2020 | Vuorenala | B66B 1/3461 |
| 2020/0122573 A1* | 4/2020 | Nishizawa | B60K 17/354 |
| 2021/0013764 A1* | 1/2021 | Heien | H02K 7/006 |

\* cited by examiner

INVERTER MODULE INTEGRATABLY MOUNTABLE WITH DRIVE UNIT OF VEHICLE

INTRODUCTION

The present disclosure relates to inverters for drive units of vehicles. Currently-known inverter modules typically are disposed in a fully-closed enclosure. Such fully enclosed inverter modules are mounted to an exterior of a frame of a sealed drive unit.

BRIEF SUMMARY

Various disclosed embodiments include illustrative inverter modules that are integratably mountable with a drive unit of a vehicle, illustrative drive units with an inverter module integratably mounted therewith, and illustrative vehicles with at least one drive unit with an inverter module integratably mounted therewith.

In an illustrative embodiment, an illustrative module for a drive unit of a vehicle includes a housing having an open face defined therein. Inverter circuitry is disposed in the housing.

In another illustrative embodiment, an illustrative drive unit for a vehicle includes a frame. A first drive member is configured to rotate a first propulsion device. A first set of gears is disposed within the frame and is configured to rotatably engage the first drive member. A first electric motor is configured to rotatably engage the first set of gears. An inverter module is integratably mounted with the frame and includes a housing having an open face defined therein and inverter circuitry disposed in the housing.

In another illustrative embodiment, an illustrative vehicle includes a vehicle body. A high voltage direct current (DC) electrical battery is disposed within the vehicle body. The vehicle includes at least one propulsion device. At least one drive unit includes a frame, at least one electric motor configured to drive the at least one propulsion device, and an inverter module integratably mounted with the frame. The inverter module includes a housing having an open face defined therein and inverter circuitry disposed in the housing.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative inverter modules that are integratably mountable with a drive unit of a vehicle, illustrative drive units with an inverter module integratably mounted therewith, and illustrative vehicles with at least one drive unit with an inverter module integratably mounted therewith.

Figure 1A:
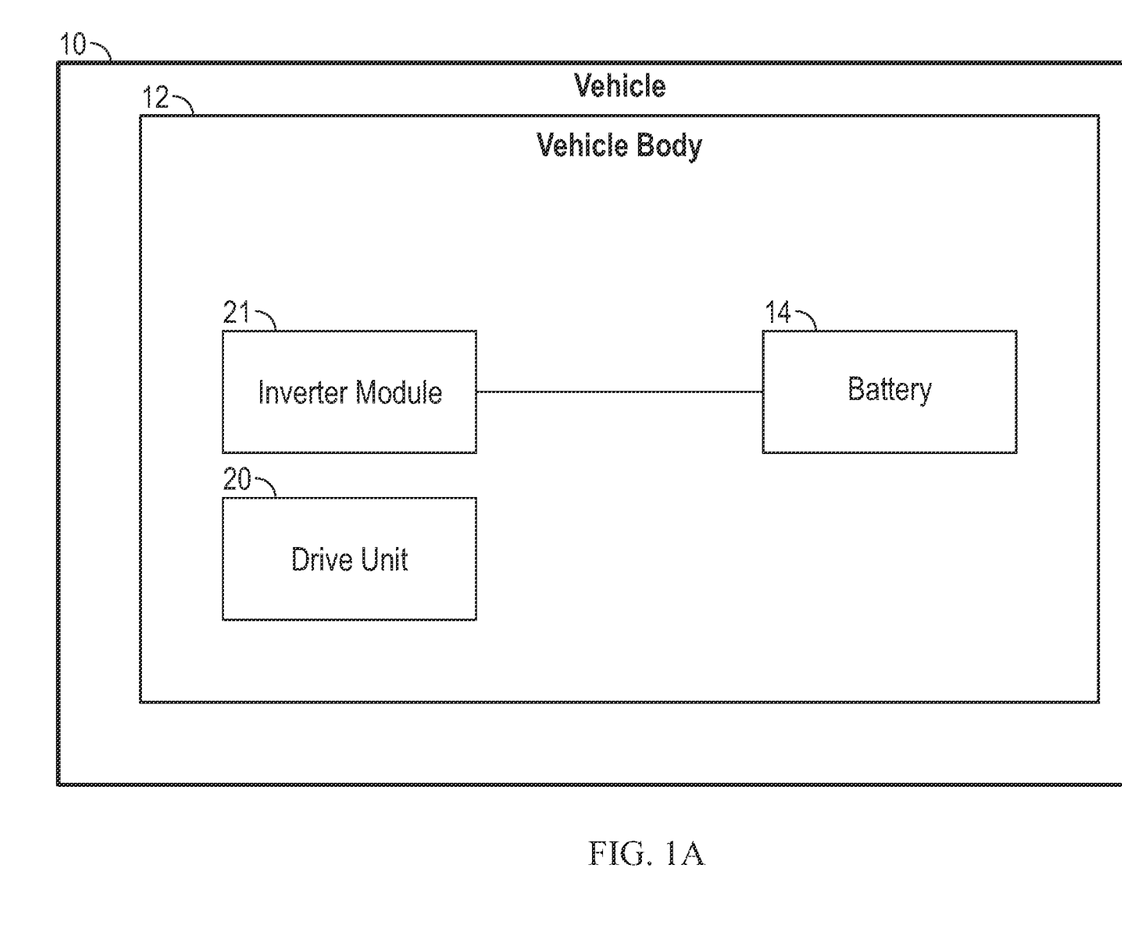
FIG. 1A is a block diagram of an illustrative vehicle with at least one drive unit.

Referring now to FIG. 1A and given by way of overview, in various embodiments an illustrative vehicle 10 includes a vehicle body 12. A high voltage direct current (DC) electrical battery 14 is disposed within the vehicle body 12. The vehicle includes at least one propulsion device (not shown in FIG. 1A). At least one drive unit 20 includes a frame (not shown in FIG. 1A), at least one electric motor (not shown in FIG. 1A) configured to drive the at least one propulsion device, and an inverter module 21 integratably mounted with the frame. The inverter module 21 includes a housing having an open face defined therein (not shown in FIG. 1A) and inverter circuitry (not shown in FIG. 1A) disposed in the housing.

Figure 1B:
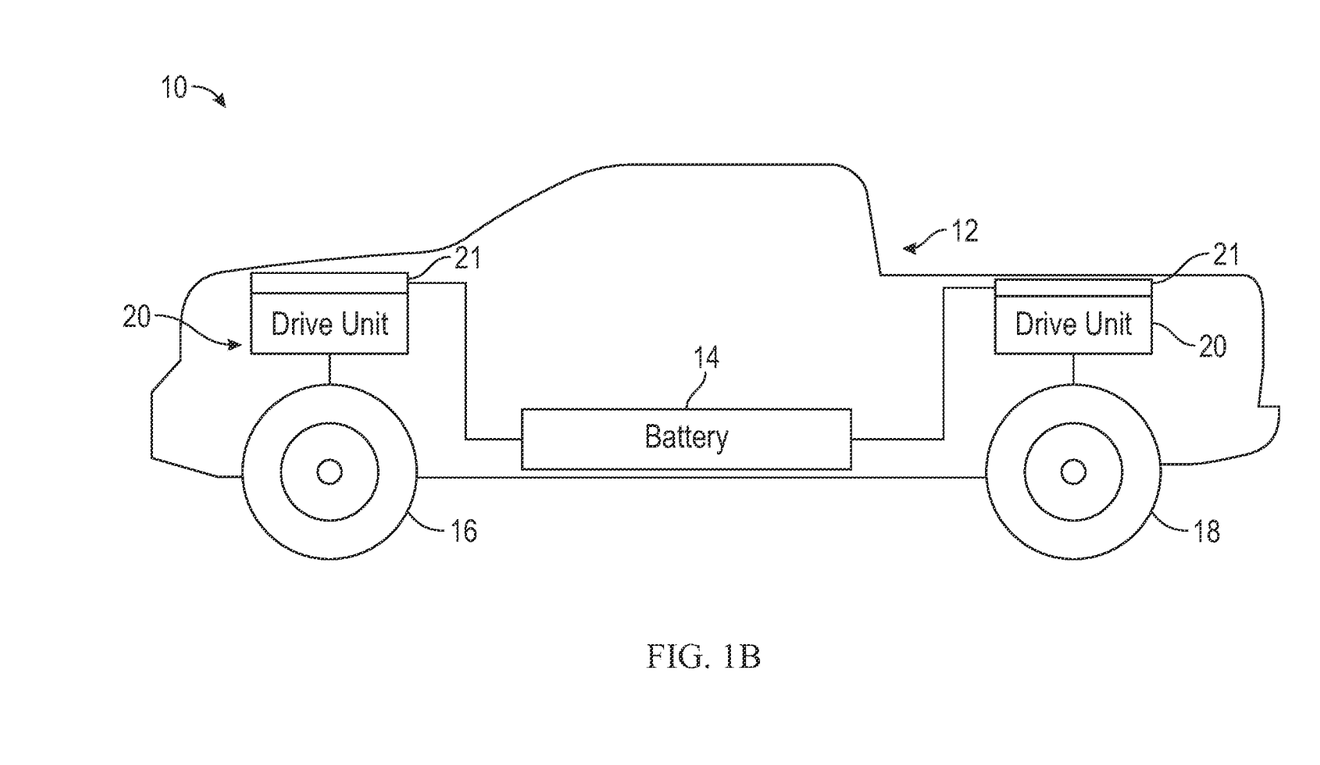
FIG. 1B is a schematic illustration of an illustrative vehicle with at least one drive unit.

For example and referring additionally to FIG. 1B, in various embodiments the vehicle 10 may include, without limitation, an electric vehicle. In such embodiments the vehicle 10 includes the vehicle body 12. The high voltage direct current (DC) electrical battery 14 is disposed within the vehicle body 12. Left and right front wheels 16 (only the left front wheel 16 is shown) are configured to rotate. Left and right rear wheels 18 (only the left rear wheel 18 is shown) are configured to rotate. At least one drive unit 20 is mechanically couplable to rotate the front wheels 16 or the rear wheels 18 (and in some embodiments one drive unit 20 may be mechanically couplable to rotate the front wheels 16 and another drive unit 20 may be mechanically couplable to rotate the rear wheels 18). The inverter module 21 is integratably mountable with its associated drive unit 20. Each inverter 21 is electrically connectable to receive high voltage DC electrical power from the battery 14. Each drive unit 20 includes at least one axle (not shown in FIG. 1B) that is mechanically couplable to rotate an associated wheel 16 or 18 and electrical motors (not shown in FIG. 1B) that are mechanically couplable to rotate its associated axle.

For sake of brevity, illustrative details are set forth below by way of non-limiting examples in the context of a motor vehicle. However, it will be appreciated that the vehicle 10 can be any type of vehicle whatsoever as desired without limitation. Given by way of non-limiting example, in various embodiments the vehicle 10 may be an electric vehicle (that is, an all-electrically driven vehicle) or a hybrid vehicle. For example and given by way of non-limiting examples, in various embodiments the vehicle 10 may include a motor vehicle driven by wheels and/or tracks, such as, without limitation, an automobile, a truck, a sport utility vehicle (SUV), a van, an all-terrain vehicle (ATV), a motorcycle, an electric bicycle, a tractor, a lawn mower such as without limitation a riding lawn mower, a snowmobile, and the like. Given by way of further non-limiting examples, in various embodiments the vehicle 10 may include a marine vessel such as, without limitation, a boat, a ship, a submarine, a submersible, an autonomous underwater vehicle (AUV), and the like. Given by way of further non-limiting examples, in various embodiments the vehicle 10 may include an aircraft such as, without limitation, a fixed wing aircraft, a rotary wing aircraft, and a lighter-than-air (LTA) craft.

Also for sake of brevity, illustrative details regarding the drive unit 20 are set forth in the context of a motor vehicle. Because the vehicle 10 is not limited to the illustrative example of a motor vehicle, it will be appreciated that the drive unit 20 also is not limited to applicability to a motor vehicle. To that end, in various embodiments the motor (or motors) of the drive unit 20 are configured to drive the vehicle 10. That is, in various embodiments the electric motor (or motors) of the drive unit 20 may drive any drive member that drives any propulsion device, such as without limitation a wheel or wheels, a track or tracks, a propellor or propellors, a propulsor or propulsors, a rotor or rotors, or the like, associated with the vehicle 10.

For example, in some embodiments in a motor vehicle one drive unit 20 may include one motor configured to drive one drive member such as an axle or a chain ring that drives one wheel or track, in some other embodiments in a motor vehicle one drive unit 20 may include one motor configured to drive an axle that rotates two wheels or two tracks, and in some other embodiments in a motor vehicle one drive unit 20 may include one motor configured to drive an axle that rotates one wheel or one track and another motor configured to drive another axle that rotates another wheel or another track.

Similarly, in some embodiments in a marine vessel one drive unit 20 may include one motor configured to drive one propeller or propulsor, in some other embodiments in a marine vessel one drive unit 20 may include one motor configured to drive a shaft that rotates two propellers or two propulsors, and in some other embodiments in a marine vessel one drive unit 20 may include one motor configured to drive a shaft that rotates one propeller or propulsor and another motor configured to drive another shaft that rotates another propeller or propulsor.

Likewise, in some embodiments in an aircraft one drive unit 20 may include one motor configured to drive one propeller or rotor, in some other embodiments in an aircraft one drive unit 20 may include one motor configured to drive a shaft that rotates two propellers or two rotors, and in some other embodiments in an aircraft one drive unit 20 may include one motor configured to drive a shaft that rotates one propeller or rotor and another motor configured to drive another shaft that rotates another propeller or rotor.

Now that an overview has been set forth, illustrative details will be explained with examples that are given by way of illustration only and not of limitation. As mentioned above, the details set forth below are given by way of illustration only and not of limitation in a context that, for sake of brevity, is that of an illustrative electric motor vehicle. As discussed above, no limitation to any vehicle is intended and is not to be inferred. Accordingly, the illustrative vehicle 10 discussed below, the illustrative drive unit 20 discussed below, and the illustrative inverter module 21 discussed below are not limited to the examples set forth below by way of illustration and not of limitation.

As mentioned above, in various embodiments the vehicle 10 may include, without limitation, an electric vehicle. In such embodiments the vehicle 10 includes the vehicle body 12. The high voltage direct current (DC) electrical battery 14 is disposed within the vehicle body 12. Left and right front wheels 16 (only the left front wheel 16 is shown) are configured to rotate. Left and right rear wheels 18 (only the left rear wheel 18 is shown) are configured to rotate. At least one drive unit 20 is mechanically couplable to rotate the front wheels 16 or the rear wheels 18 (and in some embodiments one drive unit 20 may be mechanically couplable to rotate the front wheels 16 and another drive unit 20 may be mechanically couplable to rotate the rear wheels 18). The inverter module 21 is integratably mountable with its associated drive unit 20. Each inverter 21 is electrically connectable to receive high voltage DC electrical power from the battery 14. Each drive unit 20 includes at least one axle (not shown in FIG. 1B) that is mechanically couplable to rotate an associated wheel 16 or 18 and electrical motors (not shown in FIG. 1B) that are mechanically couplable to rotate its associated axle.

Figure 3A:
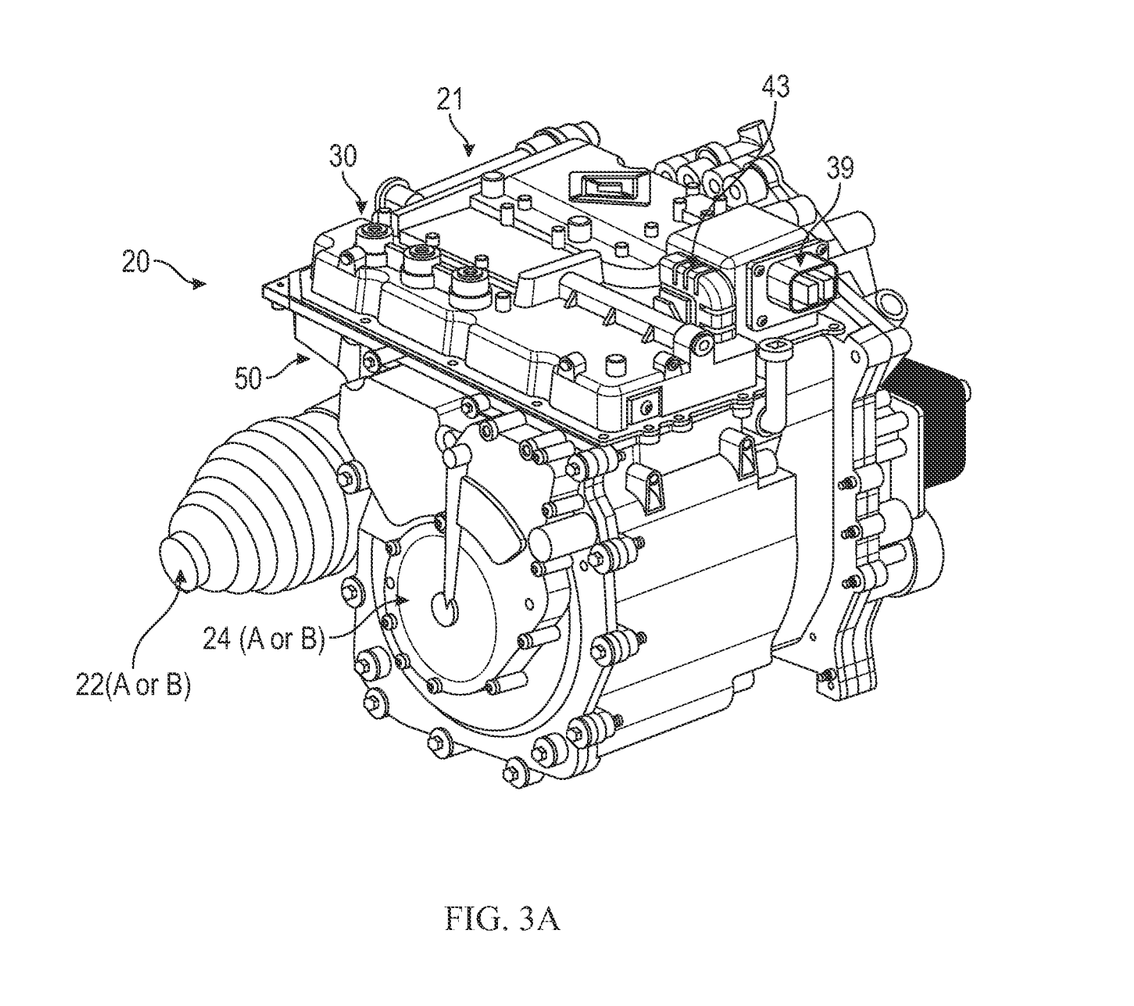
FIG. 3A a perspective view of an illustrative drive unit with the inverter module of FIG. 2A integratably mounted therewith.
Figure 3B:
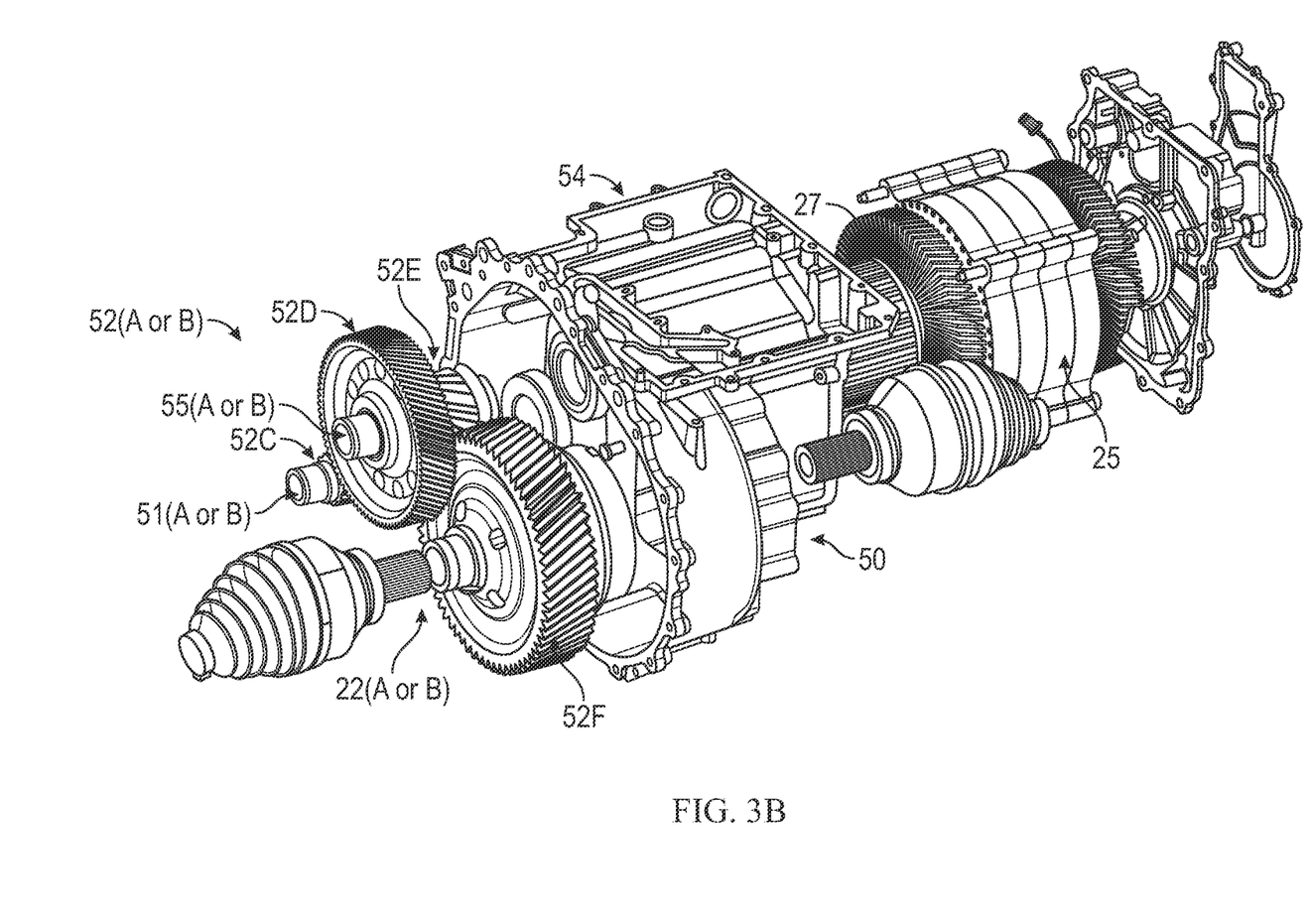
FIGS. 3B and 3C are perspective views of details of the drive unit of FIG. 3A.
Figure 3C:
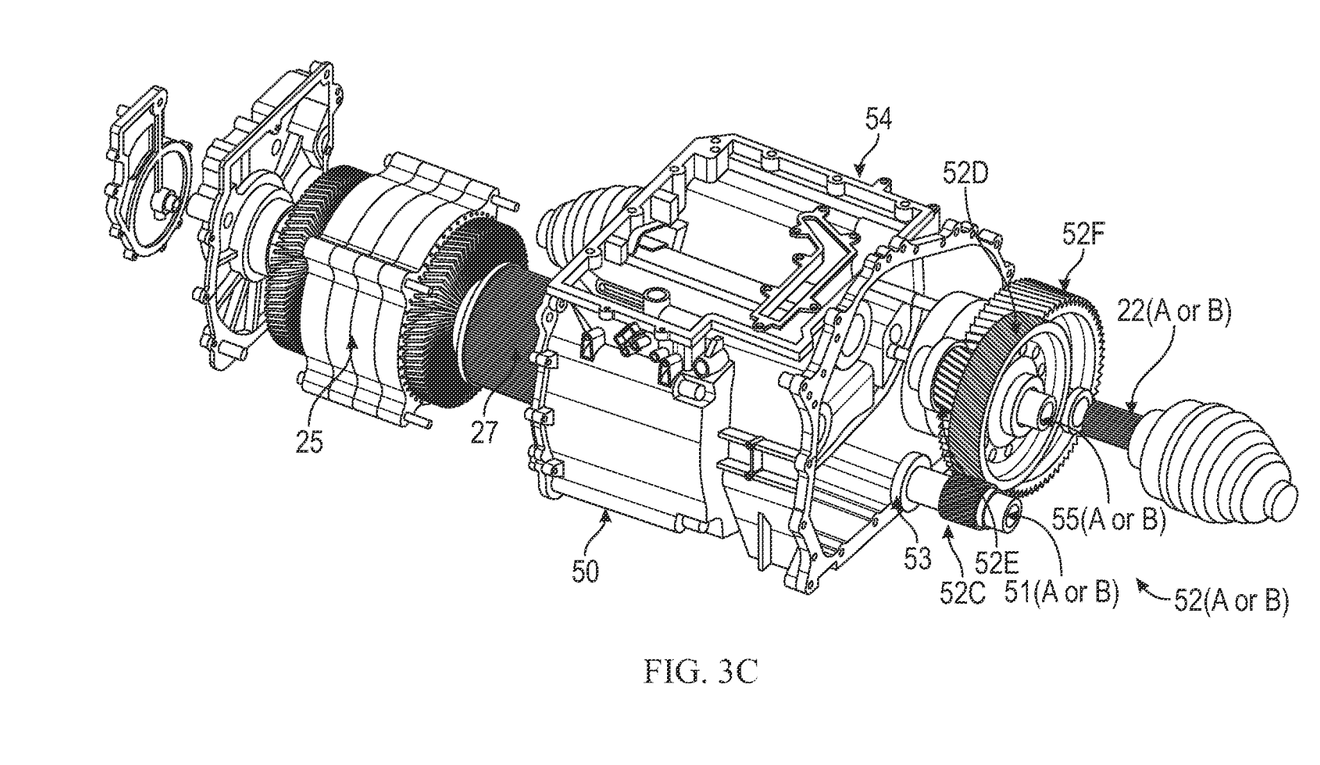

Referring briefly to FIGS. 3B and 3C, in various embodiments electrical motors 24A and 24B are configured to drive the vehicle 10 (by engaging an associated propulsion device or propulsion devices). The electrical motors 24A and 24B may be any type of alternating current (AC) electrical motor as desired for a particular application. For example, the electrical motors 24A and 24B may include a synchronous motor—like a permanent magnet motor or the like—or an asynchronous motor (or induction motor)-like a polyphase AC induction motor. In various embodiments, each electrical motor 24A and 24B includes a stator 25 that is configured to generate a rotating magnetic field responsive to application of three-phase AC electrical power from the inverter 21 (discussed below) and a rotor 27 that is configured to rotate in response to presence of the rotating magnetic field generated by the stator 25. It will be appreciated that AC electrical motors are well known in the art. Therefore, further description of their construction and operation are not necessary for an understanding of disclosed subject matter.

Referring additionally to FIGS. 2A-2D, in various embodiments the inverter module 21 is integratably mountable with the drive unit 20 (FIG. 1). In various embodiments the inverter module 21 includes a housing 30 having an open face 32 defined therein. Inverter circuitry 34 is disposed in the housing 30. In various embodiments, the open face 32 is a top face of the housing 30. It will be appreciated that, in such embodiments, a lid or cover of the housing 30 has been eliminated.

In various embodiments the housing 30 defines a sealing surface 36 that is configured to sealably engage an associated sealing surface of a frame of a drive unit (not shown in FIGS. 2A-2D). In some such embodiments, the open face 32 is defined interior the sealing surface 36 defined in the housing 30. In various embodiments, the sealing surface 36 may include material selected to enhance sealing properties, such as, without limitation, a gasket. In some such embodiments, the gasket may include gasket material such as a metal, an elastomer, a combination of metal and elastomer, and the like.

In various embodiments, the inverter circuitry 34 is disposed in the housing 30. As such, in such embodiments the inverter circuitry 34 is not mounted to the drive unit 20. It will be appreciated that disposing the inverter circuitry 34 in the housing 30 (and not mounting the inverter circuitry 34 to the drive unit 20) can help contribute to reducing vibration on the inverter circuitry 34.

In various embodiments, the inverter circuitry 34 may include a DC link capacitor 38 that is electrically couplable to receive high voltage DC electrical power from the battery 14 (such as via an electrical connection 39). The DC link capacitor 38 is used to decouple effects of inductance from the electrical battery 14 from components that are electrically connected to the DC link capacitor 38 (discussed below).

In various embodiments two inverters 40 are electrically couplable to receive high voltage DC electrical power from the DC link capacitor 38 and are configured to convert the high voltage DC electrical power to three phase, high voltage AC electrical power and to provide the provide the three phase, high voltage AC electrical power to the electrical motors 24A and 24B. Thus, in various embodiments the DC link capacitor 38 decouples effects of inductance from the electrical battery 14 from the inverters 40.

In various embodiments the inverters 40 may include banks of power electronics, such as three-terminal power semiconductor devices that may include insulated gate bipolar transistors (IGBTs) like silicon (Si) IGBTs and/or metal-oxide-semiconductor field effect transistors (MOSFETs) like silicon carbide (SiC) MOSFETs.

In various embodiments at least one controller 42 is electrically coupled to receive various vehicle status signals from various sources (such as, without limitation, a vehicle dynamics module or the like) and low voltage DC electrical power, such as 12 VDC (such as via an electrical connection 43). In various embodiments the controller 42 is configured to, among other functions, generate turn on and turn off signals and provide the turn on and turn off signals to gate drivers 44 that are, in turn, electrically coupled to drive their associated inverters 40. In various embodiments the controller 42 may provide generate control signals responsive to the vehicle status signals and provide the control signals to the inverters 40. The controller 42 may be any suitable computer processor-based controller as desired. Given by way of example only and not of limitation and as discussed further below, in various embodiments the controller 42 may include a computer processing unit (CPU), a general purpose processor, a digital signal processor, a field programmable gate array, or the like, and/or any combination thereof.

It will be appreciated that DC link capacitors, inverters (including power electronics and three-terminal power semiconductor devices), controllers, and gate drivers are well known in the art. Therefore, further description of their construction and operation are not necessary for an understanding of disclosed subject matter.

Referring additionally to FIGS. 3A-3E, in various embodiments the inverter module 21 is integratably mounted with the drive unit 20. In various embodiments and given by way of illustration only, the drive unit 20 may include a frame 50. The axle 22A is configured to rotate an associated drive wheel (such as one of the front wheels 16 or one of the rear wheels 18). The axle 22B is configured to rotate an associated drive wheel (such as the other of the front wheels 16 or the other of the rear wheels 18).

As shown in FIGS. 3B and 3C, a shaft 51A is configured to be rotated by its associated rotor 27 of its electrical motor 24A and a shaft 51B is configured to be rotated by its associated rotor 27 of its electrical motor 24B. The shafts 51A and 51B are supported and constrained within bearings 53 disposed on the frame 50. A set of gears 52A is disposed within the frame 50 and is configured to rotatably engage the axle 22A and a set of gears 52B is disposed within the frame 50 and is configured to rotatably engage the axle 22B. The electrical motor 24A is configured to rotatably engage the set of gears 52A and the electrical motor 24B is configured to rotatably engage the set of gears 52B. The inverter module 21 is integratably mounted with the drive unit 20.

In various embodiments, each of the sets of gears 52A and 52B is configured to provide speed and torque conversions from its associated electrical motor 24A or 24B to its associated axle 22A or 22B and, ultimately, an associated wheel 16 or 18. For example and given by way of illustration only and not of limitation, in various embodiments a gear 52C is configured to be rotated by its associated shaft 51A or 51B. A gear 52 D is mounted on a shaft 55A or 55B and is configured to be meshedly engaged by the gear 52C. A gear 52E also is mounted on the shaft 55A or 55B. A gear 52F is mounted on the axle 22A or 22B and is configured to be meshedly engaged by the gear 52E. It will be appreciated that, in various embodiments, the sets of gears 52A and 52B may include any number of suitable gears (such as, without limitation, planetary gears) with gear ratios selected as desired for a particular application to achieve desired speed and torque conversions. It will be appreciated that gears for use in electric vehicles are well known in the art. Therefore, further description of their construction and operation are not necessary for an understanding of disclosed subject matter.

In some embodiments, the axles 22A and/or 22B may be fixedly couplable to their associated wheels 16 and/or 18, respectively. For example and without limitation, in some such embodiments the front wheels 16 may be fixedly couplable to their associated axles 22A. It will be appreciated that such fixed coupling may help contribute to reducing mechanical complexity and may help contribute to enabling the front wheels 16 to remain steerable (such as when the vehicle 10 is being towed with the front wheels 16 and the rear wheels 18 engaged on a surface of a road (that is, flat towing).

In some other embodiments, the axles 22A and/or 22B may be removably couplable to their associated wheels 16 and/or 18. For example and without limitation, in some such embodiments the rear wheels 18 may be removably couplable to their associated axles 22B. It will be appreciated that such removable coupling of the rear wheels 18 may help contribute to avoiding generation of braking torque and/or uncontrolled electrical generation and charging of the battery 14 during towing.

It will be appreciated that, as discussed above, the drive unit 20 is not limited to embodiments that include two motors—each of which is configured to drive a drive member such as an axle or shaft associated with its own propulsion device, such as without limitation a wheel. To that end, in some embodiments one drive unit 20 may include one motor configured to drive one drive member such as an axle or a shaft or a chain ring configured to drive one propulsion device. In some other embodiments one drive unit 20 may include one motor configured to drive one drive member such as an axle or a shaft configured to drive two propulsion devices. In some other embodiments one drive unit 20 may include one motor configured to drive a drive member such as an axle or a shaft configured to drive one propulsion device and another motor configured to drive another drive member such as an axle or a shaft configured to drive another propulsion device.

Figure 2A:
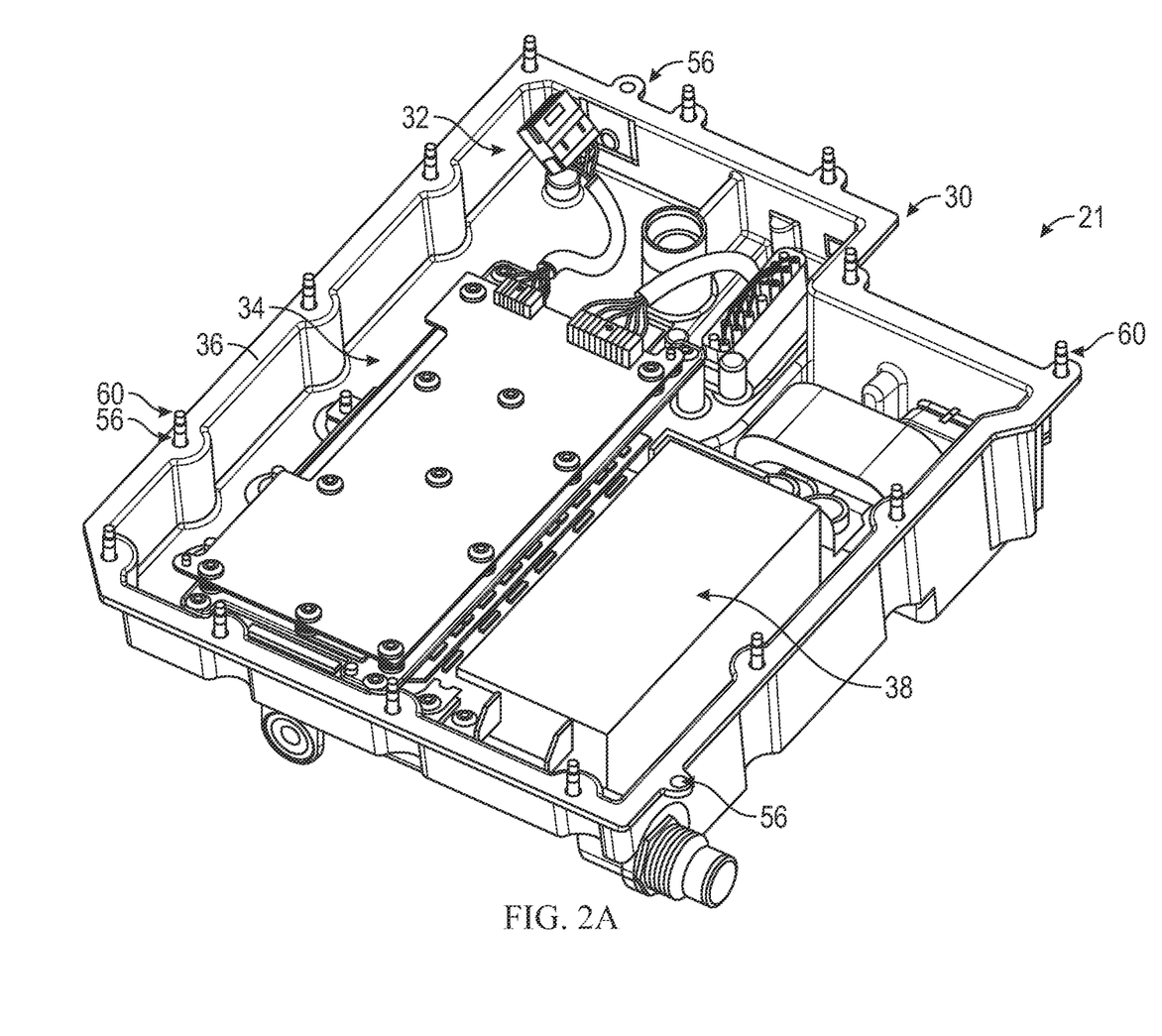
FIG. 2A is a top perspective view of an illustrative inverter module that is integratably mountable with a drive unit of a vehicle.
Figure 2B:
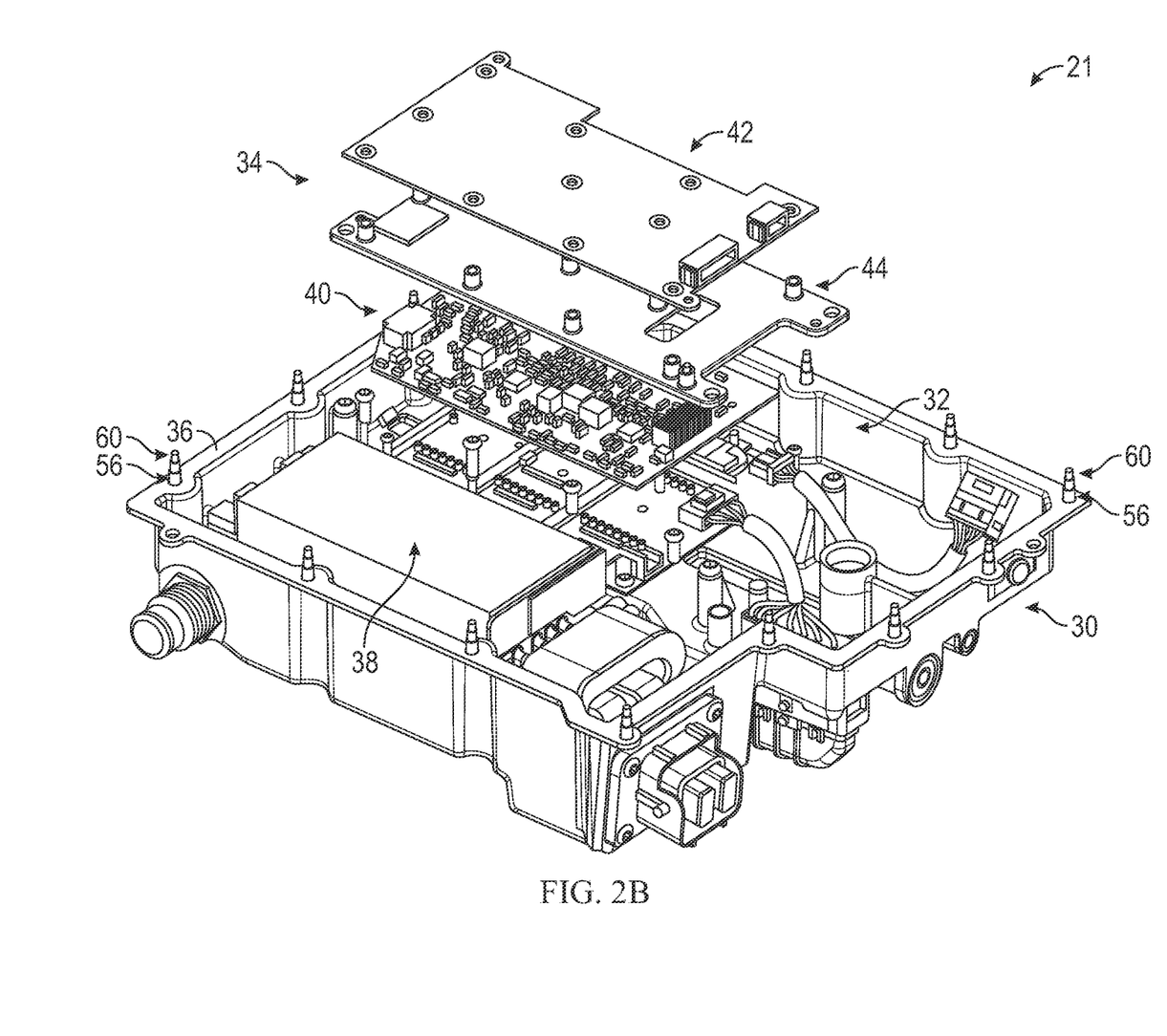
FIGS. 2B and 2C are exploded top perspective views of the inverter module of FIG. 2A.
Figure 2C:
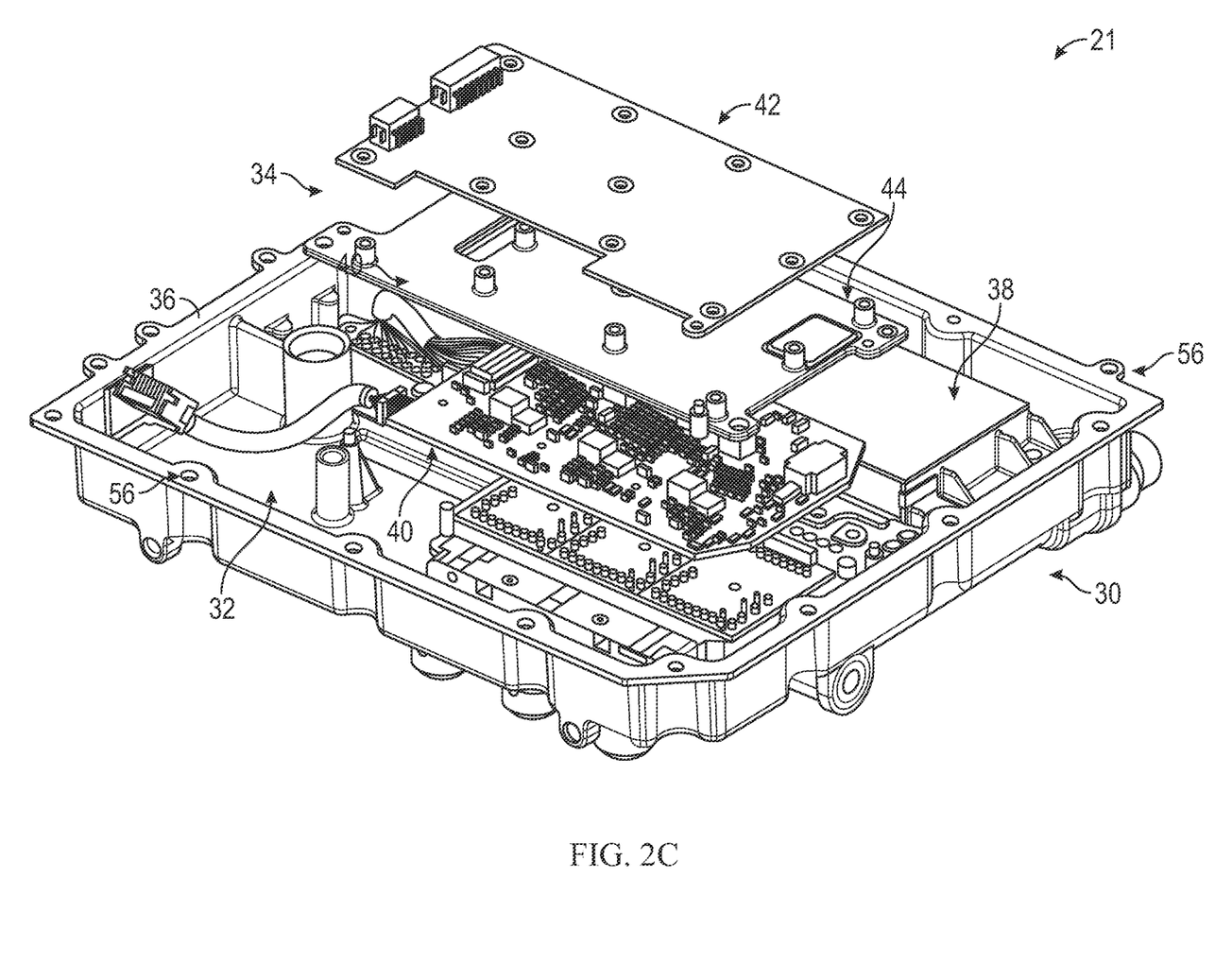
Figure 2D:
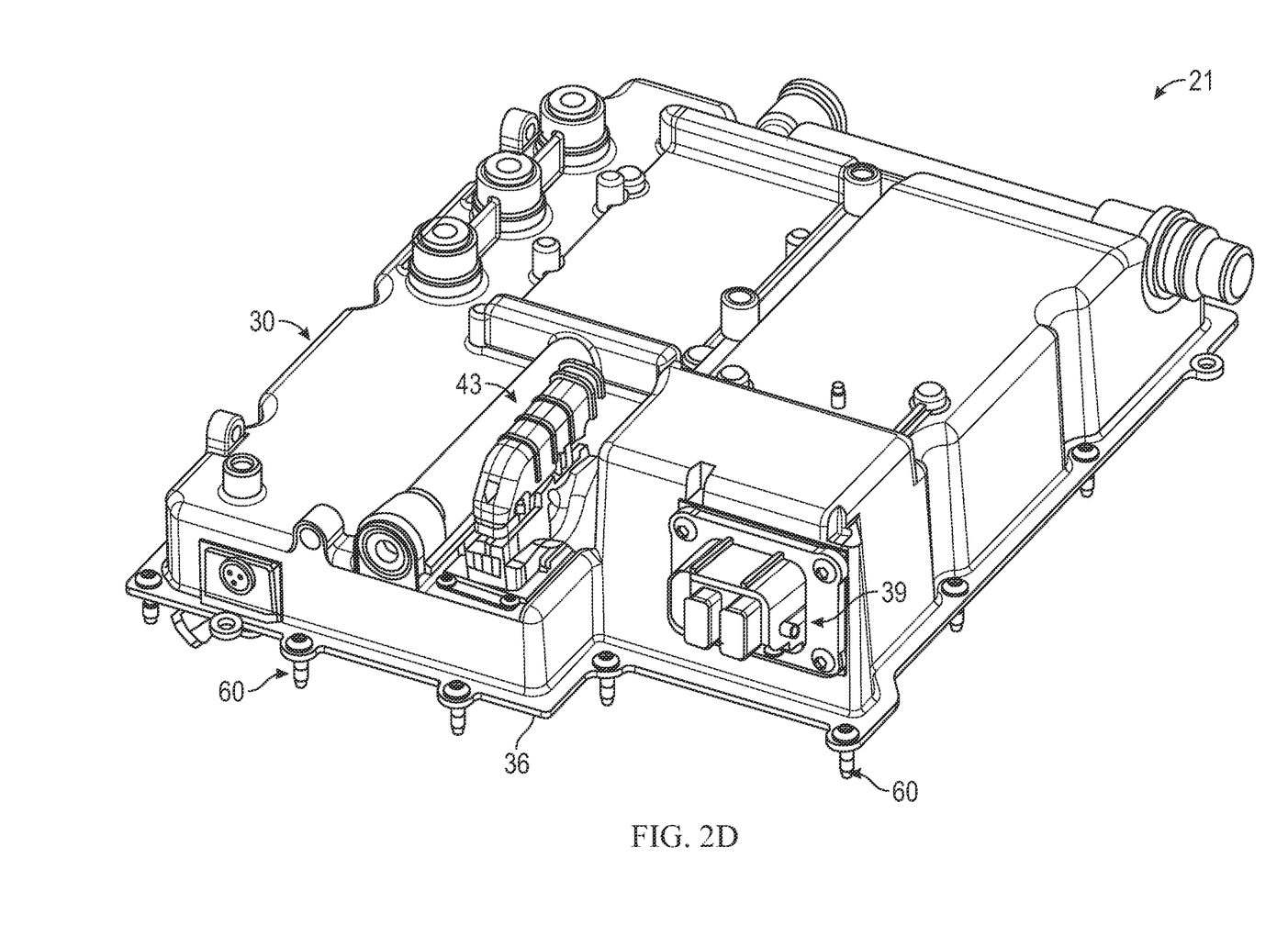
FIG. 2D is a bottom perspective views of the inverter module of FIG. 2A.

In various embodiments and as discussed above, the housing 30 defines the open face 32 therein and the open face 32 is a top face of the housing 30, thereby eliminating a lid or cover of the housing 30. In such embodiments, the inverter module 21 can be tested and the open face 32 can provide access to components of the inverter module 21 for testing and any resultant replacement and/or repair as desired. As also discussed above, in various embodiments the housing 30 defines the sealing surface 36 and the open face 32 is defined interior the sealing surface 36.

Figure 3D:
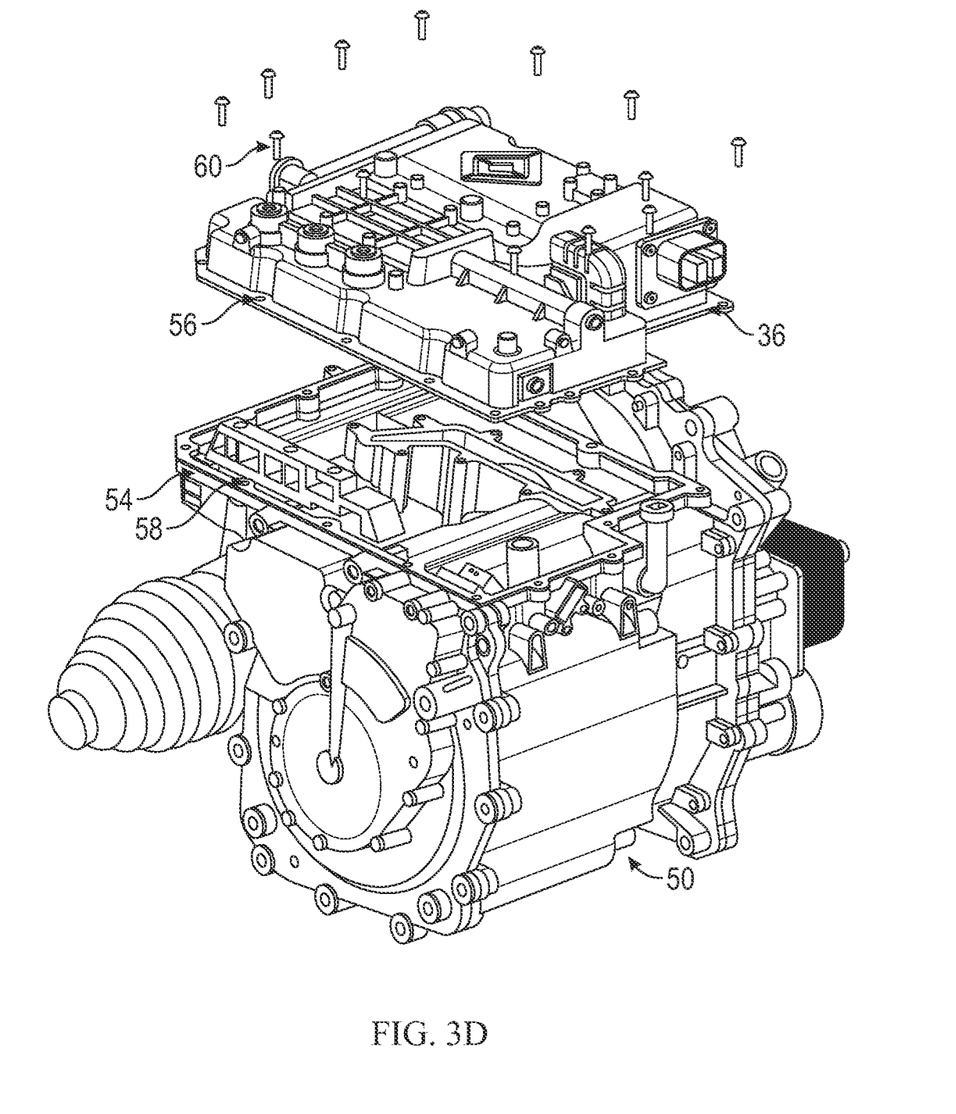
FIGS. 3D and 3E are exploded perspective views of mounting of the inverter module of FIG. 2A with the drive unit of FIG. 3A.
Figure 3E:
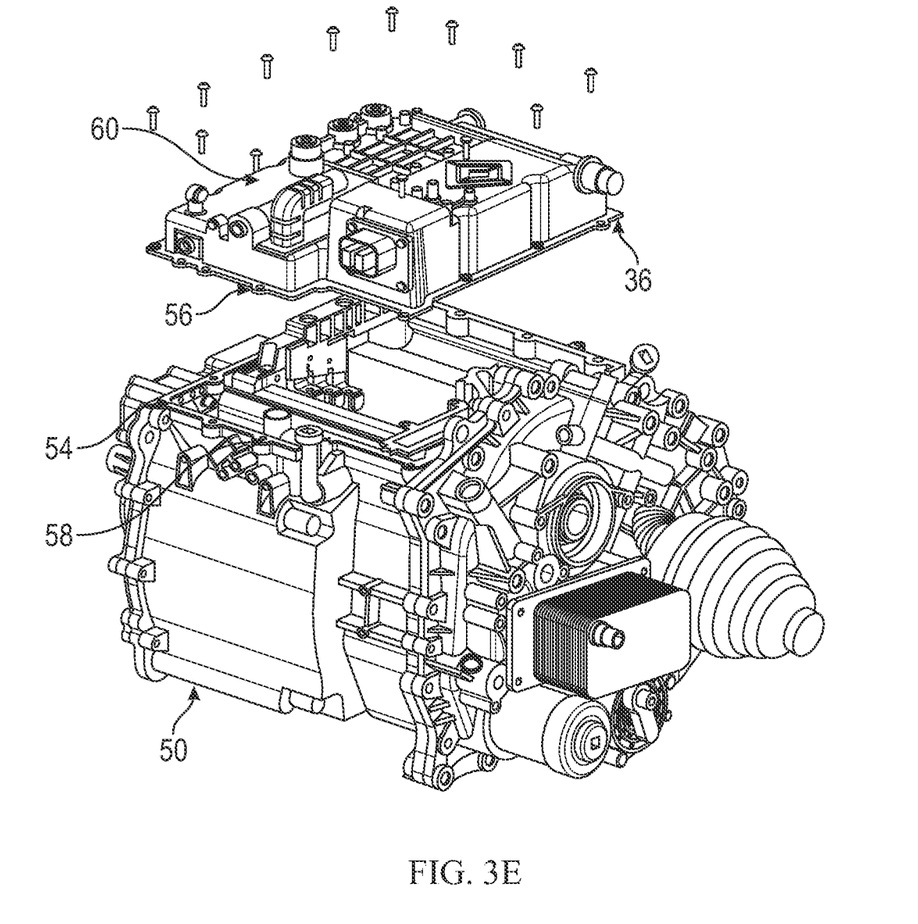

As shown in FIGS. 3D and 3E and as discussed above, in various embodiments the sealing surface 36 defined in the housing 30 is configured to sealingly engage an associated sealing surface 54 of the frame 50 of the drive unit 20. In various embodiments, holes 56 are defined in the sealing surface 36 and the housing 30 and holes 58 are defined in the sealing surface 54 and the frame 50. The holes 56 and 58 line up with each other.

Fasteners 60 are placed through the holes 56 and 58 to sealingly engage the sealing surfaces 36 and 54, thereby integratably mounting the inverter module 21 with the drive unit 20. In some embodiments the fasteners 60 may be threaded fasteners. In such embodiments, the holes 58 are threaded holes and the fasteners 60 threadedly engage the holes 58, thereby drawing the sealing surfaces 36 and 54 toward each other into sealing engagement. However, it will be appreciated that the fasteners 60 may be any suitable fastener as desired.

It will be appreciated that, in various embodiments, the open face 32 may be a top face of the housing 30. By integratably mounting the inverter module 21 with the drive unit 20 by sealingly engaging the sealing surfaces 36 and 54, in such embodiments the inverter module 21 has been mounted in an inverted manner (or "upside down") on the frame 50 of the drive unit 20. It will be appreciated that such an inverted mounting uses vacant space within the frame 50. For example, in various embodiments some portions of components of the inverter module 21 (such as at least a portion of the DC link capacitor 38, some of the inverter circuitry 34, and/or various connector and wiring) may extend past a plane of the sealing surface 36 and into a cavity within the frame 50. Such inverted mounting can thus help contribute to reducing z-height elevation. It will be appreciated that reducing z-height elevation can help contribute to resolving z-height constraints with nearby powertrain components. It will also be appreciated that reducing z-height elevation can also help contribute to reducing overall z-height of the motor compartment, which can help contribute to reductions in weight and/or wind resistance of the electric vehicle 10.

It will be appreciated that some drive units 20 for different electric vehicles 10 may have overall dimensions that differ from each other due to various factors. For example, different torque and speed specifications for different electric vehicles 10 may result in different sizes of electrical motors 24A and 24B and sets of gears 52A and 52B, thereby resulting in different overall dimensions of the different drive units 20. If desired, in various embodiments the frames 50 of more than one (and in some embodiments, if desired, all) of the different drive units 20 may define the sealing surfaces 54 to be sized and configured to sealingly engage the associated sealing surface 36 of the housing 30 of the inverter module 21. That is, in such embodiments the inverter 21 can be integratably mounted with drive units 20 of different overall dimensions. Thus, in such embodiments the inverter module 21 can be used in multiple vehicle platforms.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller, as used in the foregoing/following disclosure, may refer to a collection of one or more components (such as processors) that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of processor (e.g., at a first time), as a second type of processor (e.g., at a second time, which may in some instances coincide with, overlap, or follow a first time), and/or as a third type of processor (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first processor that has a first purpose, then a second processor that has a second purpose and then, a third processor that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different component in as little as a few nanoseconds. A component may reconfigure on-the-fly, e.g., the reconfiguration of a component from a first component into a second component may occur just as the second component is needed. A component may reconfigure in stages, e.g., portions of a first component that are no longer needed may reconfigure into the second component even before the first component has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a component for displaying graphics on a screen, a component for writing data to a storage medium, a component for receiving user input, and a component for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components, the example includes the possibility that the same hardware may implement more than one of the recited components, either contemporaneously or at discrete times or timings. The implementation of multiple components, whether using more components, fewer components, or the same number of components as the number of components, is merely an implementation choice and does not generally affect the operation of the components themselves. Accordingly, it should be understood that any recitation of multiple discrete components in this disclosure includes implementations of those components as any number of underlying components, including, but not limited to, a single component that reconfigures itself over time to carry out the functions of multiple components, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A drive unit for a vehicle, the drive unit comprising:
a frame;
a first drive member configured to rotate a first propulsion device;
a first plurality of gears disposed within the frame and configured to rotatably engage the first drive member;
a first electric motor configured to rotatably engage the first plurality of gears; and
an inverter module integratably mountable with the frame, the inverter module including:
a housing having an open face defined therein and mounted with the frame by a plurality of fasteners, wherein the open face is the top face of the housing and the top face is mounted to the frame with the housing inverted; and
inverter circuitry disposed in and mounted to the housing through the open face, wherein the inverter circuitry is mounted with the frame via the housing and the housing utilizes no lid or cover when inverted and mounted to the frame.

2. The drive unit of claim 1, further comprising:
a second drive member configured to rotate a second propulsion device;
a second plurality of gears disposed within the frame and configured to rotatably engage the second drive member; and
a second electric motor configured to rotatably engage the second plurality of gears.

3. The drive unit of claim 1, wherein:
the frame defines a first sealing surface; and
the housing defines a second sealing surface configured to sealably engage the first sealing surface.

4. The drive unit of claim 3, wherein the first and second sealing surfaces each include a gasket.

5. The drive unit of claim 3, wherein the open face is defined interior the first sealing surface.

6. The drive unit of claim 3, wherein:
the first sealing surface defines a first plurality of holes therein; and
the second sealing surface defines a second plurality of holes therein that are alignable with the first plurality of holes.

* * * * *